(12) United States Patent
Somanath et al.

(10) Patent No.: US 10,160,550 B1
(45) Date of Patent: Dec. 25, 2018

(54) ICE DETECTION AND REAL TIME ICE ESTIMATION USING INNOVATIVE SENSOR DATA LEARNING APPROACHES

(71) Applicant: UNITED TECHNOLOGIES CORPORATION, Farmington, CT (US)

(72) Inventors: Nagendra Somanath, South Windsor, CT (US); Edgar A Bernal, Webster, NY (US); Michael J Giering, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/851,136

(22) Filed: Dec. 21, 2017

(51) Int. Cl.
| | |
|---|---|
| *G08B 21/00* | (2006.01) |
| *B64D 15/20* | (2006.01) |
| *G06T 7/00* | (2017.01) |
| *G06K 9/00* | (2006.01) |

(52) U.S. Cl.
CPC ......... *B64D 15/20* (2013.01); *G06K 9/00718* (2013.01); *G06T 7/97* (2017.01); *G06T 2207/10016* (2013.01)

(58) Field of Classification Search
CPC .......................... B64D 15/20; B64C 2201/024
USPC ....................................................... 340/962
See application file for complete search history.

(56) References Cited

U.S. PATENT DOCUMENTS

| | | | | |
|---|---|---|---|---|
| 2008/0128556 A1* | 6/2008 | Platt | ....................... | B64D 15/20 244/134 F |
| 2013/0177417 A1* | 7/2013 | Olesen | .................... | G01L 1/246 416/1 |
| 2016/0052634 A1* | 2/2016 | Almond | ................ | B64C 39/024 701/10 |

* cited by examiner

*Primary Examiner* — Fabricio R Murillo Garcia
(74) *Attorney, Agent, or Firm* — Snell & Wilmer L.L.P.

(57) ABSTRACT

Systems and methods for aircraft ice detection and mitigation. The system for aircraft ice detection and mitigation may comprise a controller, and a tangible, non-transitory memory configured to communicate with the controller, the tangible, non-transitory memory having instructions stored thereon that, in response to execution by the controller, cause the controller to perform operations comprising receiving, by the controller, a video signal from a first data, mapping, by the controller, the video signal to a discriminative feature space in response to a mapping function, generating, by the controller, a first extracted feature in response to the mapping function and the discriminative feature space, generating, by the controller, a behavioral model in response to the first extracted feature, and determining, by the controller, an icing condition of the aircraft in response to the extracted feature and the behavioral model.

18 Claims, 6 Drawing Sheets

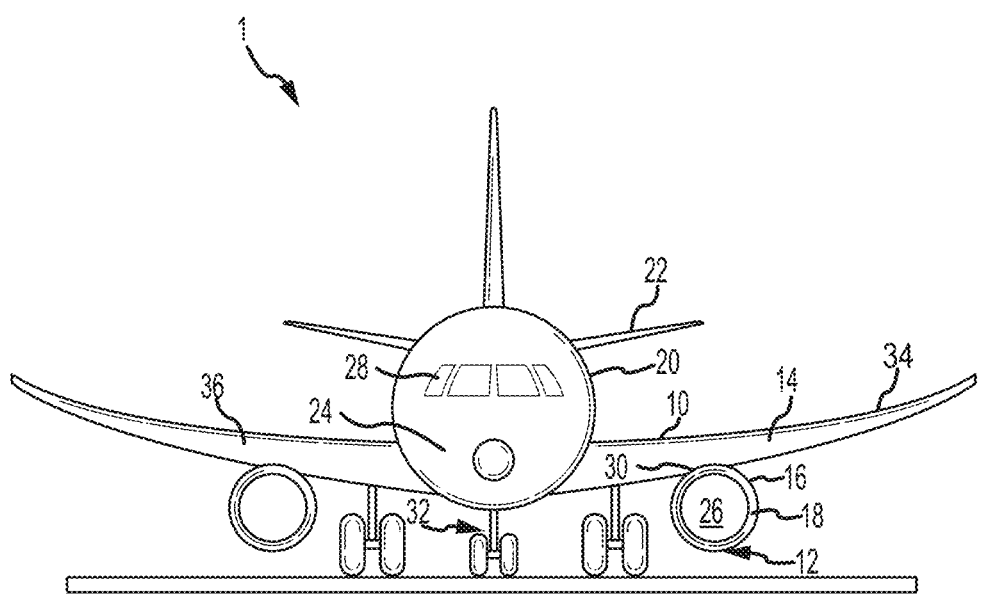
FIG.1
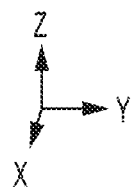

US 10,160,550 B1

ICE DETECTION AND REAL TIME ICE ESTIMATION USING INNOVATIVE SENSOR DATA LEARNING APPROACHES

FIELD

The present disclosure relates to aircraft anti-icing systems, and, more specifically, to systems and methods for ice detection and anti-icing system control.

BACKGROUND

Aircraft operating in an icing environment may experience ice buildup tending to increase aircraft weight, reduce aircraft control system effectiveness, degrade engine performance, and generally tend to result in an unsafe condition of the aircraft.

SUMMARY

In various embodiments, a system for aircraft ice detection and mitigation is provided. The system may comprise a controller, and a tangible, non-transitory memory configured to communicate with the controller, the tangible, non-transitory memory having instructions stored thereon that, in response to execution by the controller, cause the controller to perform operations comprising receiving, by the controller, a video signal from a first data mapping, by the controller, the video signal to a discriminative feature space in response to a mapping function generating, by the controller, a first extracted feature in response to the mapping function and the discriminative feature space generating, by the controller, a behavioral model in response to the first extracted feature, and determining, by the controller, an icing condition of an aircraft in response to the extracted feature and the behavioral model.

In various embodiments, the first data comprises sensor output from at least one of an image acquisition device, a depth sensitive device, an RGB sensor, an infrared sensor, a hyperspectral sensor, a multispectral sensor, or a thermal sensor. In various embodiments, the receiving, by the controller, a video signal from the sensor further comprises capturing, by the controller, a video frame from the video signal, and generating, by the controller, a processed imagery from the video frame. In various embodiments, the operations further comprise transmitting, by the controller, the first extracted feature to a statistical modeling module. In various embodiments, the discriminative feature space is at least one of color, texture, edges, or a learned feature generated in response to at least one of a supervised deep learning technique or an unsupervised deep learning technique. In various embodiments, the operations further comprise defining, by the controller, a first class boundary in response to the behavioral model. In various embodiments, the determining, by the controller, the icing condition of the aircraft in response to the extracted feature and the behavioral model further comprises further comprises extracting, by the controller, a second extracted feature, computing, by the controller, in response to one of the first extracted feature or the second extracted feature, a feature statistic with respect to the behavioral model, and classifying, by the controller, the feature statistic with respect to one of the first class boundary, a second class boundary, or the behavioral model. In various embodiments, the second extracted feature is an individual pixel-level feature. In various embodiments, the operations further comprise generating, by the controller, a classified feature statistic in response to the classifying, by the controller, the feature statistic with respect to one of the first class boundary, the second class boundary, or the behavioral model, aggregating, by the controller, the classified feature statistic over the video frame, and computing, by the controller, one of an ice area coverage or an ice area shape with respect to time in response to the aggregating, by the controller, the classified feature statistic over the video frame. In various embodiments, the aircraft further comprises an ice protection system in electronic communication with the controller. In various embodiments, the operations further comprise controlling, by the controller, the ice protection system in response to the determining, by the controller, an icing condition of the aircraft.

In various embodiments, a method for aircraft ice detection and mitigation is provided. The method may comprise receiving, by the controller, a video signal from a first data, mapping, by the controller, the video signal to a discriminative feature space in response to a mapping function, generating, by the controller, a first extracted feature in response to the mapping function and the discriminative feature space generating, by the controller, a behavioral model in response to the first extracted feature, and determining, by the controller, an icing condition of an aircraft in response to the extracted feature and the behavioral model.

In various embodiments, the method may also comprise capturing, by the controller, a video frame from the video signal; and generating, by the controller, a processed imagery from the video frame. In various embodiments, the method may further comprise transmitting, by the controller, the first extracted feature to a statistical modeling module. In various embodiments, the method may further comprise defining, by the controller, a first class boundary in response to the behavioral model. In various embodiments, the method may further comprise extracting, by the controller, a second extracted feature; in response to one of the first extracted feature or the second extracted feature, computing, by the controller, a feature statistic with respect to the behavioral model; and classifying, by the controller, the feature statistic with respect to one of the first class boundary, a second class boundary, or the behavioral model. In various embodiments, the method may further comprise generating, by the controller, a classified feature statistic in response to the classifying, by the controller, the feature statistic with respect to one of the first class boundary, the second class boundary, or the behavioral model; aggregating, by the controller, the classified feature statistic over the video frame; and computing, by the controller, one of an ice area coverage or an ice area shape with respect to time in response to the aggregating, by the controller, the classified feature statistic over the video frame.

In various embodiments an article of manufacture is provided. The article of manufacture may include a tangible, non-transitory computer-readable storage medium having instructions stored thereon that, in response to execution by a processor, cause the processor to perform operations comprising: receiving, by the processor, a video signal from a first data, mapping, by the processor, the video signal to a discriminative feature space in response to a mapping function, generating, by the processor, a first extracted feature in response to the mapping function and the discriminative feature space, generating, by the processor, a behavioral model in response to the first extracted feature, and determining, by the processor, an icing condition of the aircraft in response to the extracted feature and the behavioral model.

In various embodiments the article of manufacture may further comprise the operation of capturing, by the processor, a video frame from the video signal; generating, by the processor, a processed imagery from the video frame; transmitting, by the processor, the first extracted feature to a statistical modeling module; defining, by the processor, a first class boundary in response to the behavioral model; extracting, by the processor, a second extracted feature; computing, by the processor, in response to one of the first extracted feature or the second extracted feature, a feature statistic with respect to the behavioral model; and classifying, by the processor, the feature statistic with respect to one of the first class boundary, a second class boundary, or the behavioral model. In various embodiments the article of manufacture may further comprise the operation of generating, by the processor, a classified feature statistic in response to the classifying, by the processor, the feature statistic with respect to one of the first class boundary, the second class boundary, or the behavioral model; aggregating, by the processor, the classified feature statistic over the video frame; and computing, by the processor, one of an ice area coverage or an ice area shape with respect to time in response to the aggregating, by the processor, the classified feature statistic over the video frame.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 1 illustrates an aircraft, in accordance with various embodiments;

DETAILED DESCRIPTION

Figure 2:
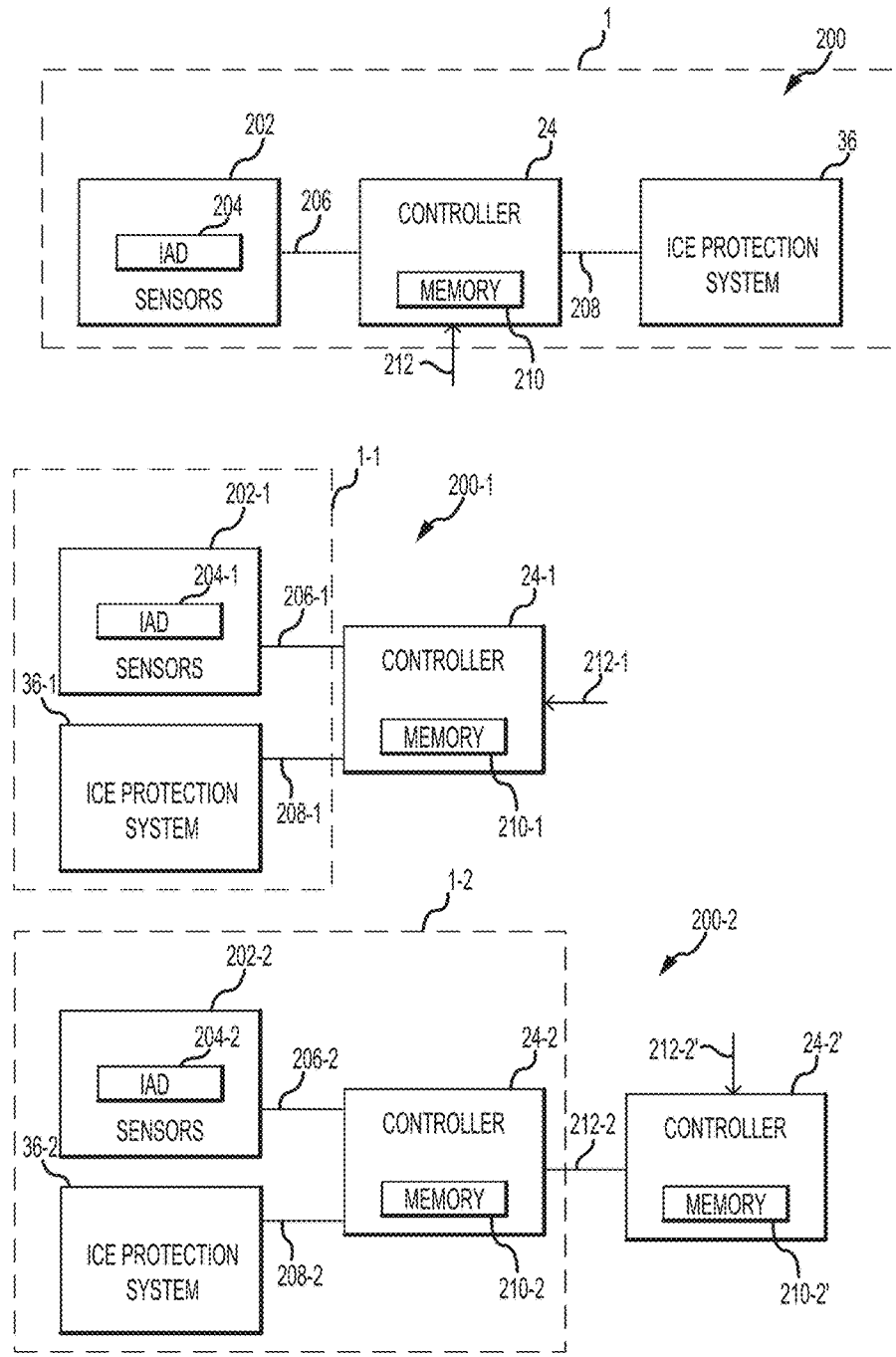
FIG. 2 illustrates a block diagram for a system for aircraft ice detection and mitigation, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending electronic data from one system component to another via electronic communication between the components. Additionally, as used herein, "electronic data" may include encompassing information such as commands, queries, files, data for storage, and the like in digital or any other form.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

With reference to FIG. 1, an aircraft 1 in accordance with various embodiments may comprise wings 10, fuselage 20, empennage 22 and aircraft systems, for example, landing gear such as landing gear 32 and propulsion systems such as gas turbine engine 12. An XYZ axes is used throughout the drawings to illustrate the axial (y), forward (x) and vertical (z) directions relative to aircraft 1. Landing gear 32, may generally support aircraft 1 when aircraft is not in flight, allowing aircraft 1 to taxi, take off, and land without damage. Gas turbine engine 12 is housed in nacelle 16 and has an inlet 26 defined by lip 18 generally provides forward thrust to aircraft 1. Wings 10 and fuselage 20 may generally support aircraft 1 and provide lift while control surfaces 34 and empennage 22 provide directional control when in flight. In various embodiments, in response to aircraft 1 operating in an icing environment, ice may build up on surfaces of aircraft 1 such as, for example, leading edge 14 of wings 10, within inlet 26, or around lip 18 of nacelle 16. In various embodiments, ice may be present on any part of aircraft 1 and may be dislodged and, in response, ingested through inlet 26 tending to damage gas turbine engine 12. In various embodiments, ice buildup on surfaces of aircraft 1 may tend to inhibit the function of control surfaces 34, empennage 22, landing gear 32, and generally tend to reduce the overall performance of aircraft 1.

In various embodiments and with additional reference to FIG. 2, a schematic diagram of a system for aircraft ice detection and mitigation 200 is illustrated. Aircraft ice detection and mitigation system may comprise sensors 202, controller 24, and an ice protection system 36 configured to inhibit ice buildup on surfaces, such as, for example, lip 18, inlet 26, and leading edge 14, of aircraft 1. In various embodiments, ice protection system 36 may be in electronic communication with controller 24 and may receive commands 208 or signals from controller 24, for example, to activate or deactivate ice protection system elements such as, for example, de-icing boots, heaters, bleed air systems, or de-icing fluid systems. In various embodiments, controller 24 may be in electronic communication with cockpit controls 28. Controller 24 is in electronic communication with sensors 202, such as, for example, one or more image acquisition devices (IAD) 204 including charge-coupled devices (CCDs), or complimentary metal-oxide semiconductor (CMOS) sensors which may output data signals and/or information relating to engine and/or aircraft data parameters which may be used in conjunction to detect operating conditions, such as icing conditions or ice buildup, of aircraft 1 and gas turbine engine 12 (FIG. 1). In some embodiments, image acquisition device 204 may include depth-capable sensors in addition to or instead of light-sensitive sensors. Examples of such sensors include structured-light and time of flight cameras.

In various embodiments, sensors 202 may comprise one or more temperature sensors, pressure sensors, vibration sensors, airspeed sensors, optical transducers, or any other sensor capable of measuring the state of an aircraft or aircraft component in flight. In various embodiments, an IAD 204 may comprise an RGB optical camera system, a near infrared camera system or thermal camera system, or other hyperspectral or multispectral imaging system as known to those skilled in the art and may output video signals 206 to controller 24. In various embodiments, controller 24 may be integrated into computer systems onboard aircraft 1. In various embodiments, portions of a system for aircraft ice detection and mitigation 200 may be located off-board (referring to system 200-1 and system 200-2). In this regard, controller 24 may be located externally from an aircraft (for example, 24-1 and 24-2'), in any suitable computer-based system. In various embodiments, controller 24 may comprise a processor. In various embodiments, controller 24 may be implemented in a single processor or one or more processors (for example 24-2 and 24-2') configured to implement various logical operations in response to execution of instructions, for example, instructions stored on a non-transitory, tangible, computer-readable medium such as, for example, memory 210 which may store data used, for example, for trending and analysis/prognosis purposes. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

In various embodiments, controller 24 may interpret sensor data including video signals 206 or a first data from sensors 202 and IADs 204 for ice detection. In various embodiments, controller 24 may receive and interpret off board data 212 which may comprise configuration data, pre-recorded sensor data, or any other data. In various embodiments, controller 24 may receive and may use multiple data outputs from one or more sensors 202 and IADs 204 located about aircraft 1 in order to determine if an icing condition exists and/or to determine the extent, severity, and location of ice buildup with increased accuracy. In various embodiments, in response to a determination of an icing condition, controller 24 may output an alert condition to cockpit controls 28 and be displayed on a display device such as, for example, an indicator light or monitor light in the cockpit of aircraft 1. In various embodiments, in response to a determination of an icing condition, controller 24 may control ice protection system 36.

Figure 3:
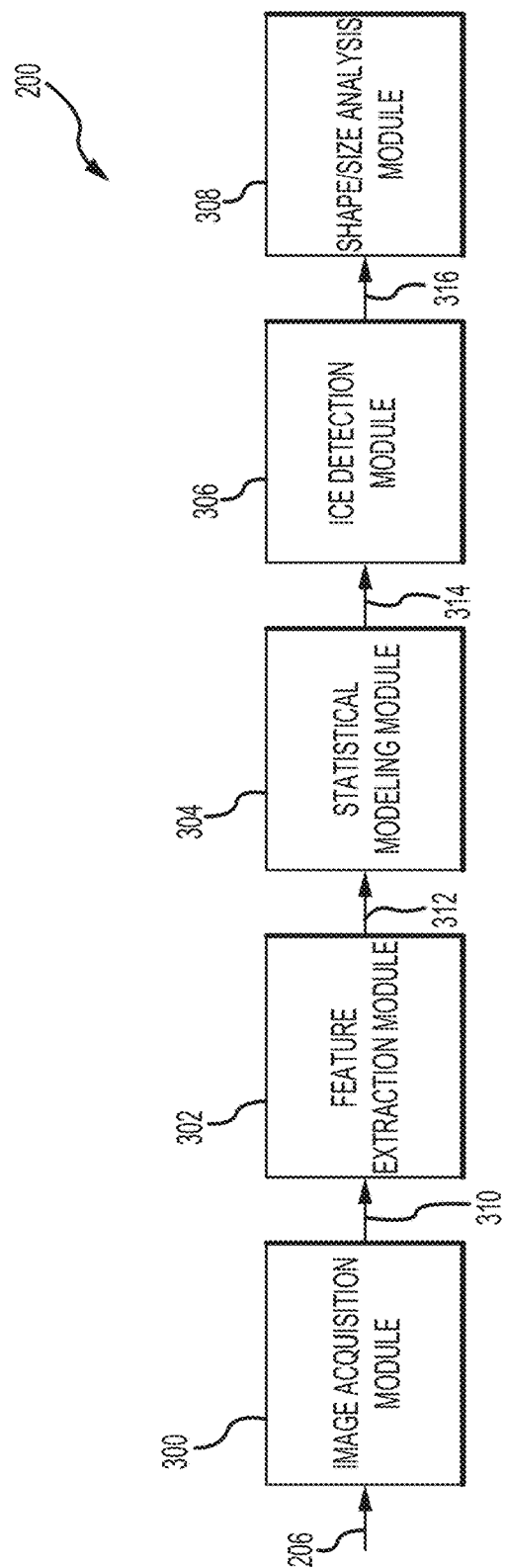
FIG. 3 illustrates a block diagram for a system for aircraft ice detection and mitigation, in accordance with various embodiments.

In various embodiments and with additional reference to FIG. 3, controller 24 may determine an icing condition by processing data from sensors 202 including video signals 206 through one or more processing modules. Controller 24 may use Image Acquisition Module (IAM) 300 to perform capture of video frames or imagery from video signals 206 from IADs 204 and may comprise image pre-processing and noise reduction filters. Imagery 310 processed and acquired by the IAM 300 is passed to Feature Extraction Module (FEM) 302.

The FEM 302 receives the imagery 310 from the IAM 300 and maps pixel values of imagery 310 via a mapping function to a discriminative feature space which is conducive to ice detection thereby producing extracted features 312. In various embodiments, the mapping function is the identity function and the feature space is the RGB color space in the case of light-sensitive sensors, or depth data in the case of depth-capable sensors. In various embodiments, features related to color (e.g., color histograms), texture (e.g., local binary patterns, textons, wavelet, Gabor, and FFT features), edges (e.g., histogram of gradients, edge maps), and/or combinations thereof may be used by FEM 302. In various embodiments, features used by FEM 302 may be learned in an end-to-end manner either by unsupervised (e.g., via the use of by autoencoders) or supervised (e.g., via the use of convolutional neural networks) deep learning techniques. For example, in a supervised deep learning technique, data comprising imagery and data labels defining regions of ice within the imagery may be passed to the FEM 302 and the FEM 302 may select features or combinations of features describing the areas defined by the data labels. In various embodiments, features used by FEM 302 learned by deep learning techniques are learned contemporaneously with the models produced by Statistical Modeling Module (SMM) 304. The FEM supplies the extracted features 312 of the imagery 310 to the SMM 304 for additional processing by the SMM 304.

In various embodiments, the SMM 304 constructs a behavioral model describing the behavior of extracted features 312 supplied by the FEM 302 in regions unaffected by ice such as, for example, those from an unsupervised deep learning technique. In various embodiments, the SMM 304 may construct models describing the behavior of extracted features 312 in regions both affected and unaffected by ice such as, for example, those learned from supervised deep learning techniques. In various embodiments, a behavioral model for regions unaffected by ice may comprise a statistical model (e.g., a parametric density model such as a Gaussian Mixture Model or deep learning based estimates, or a non-parametric density model such as a kernel-based estimate) describing the representative behavior of features corresponding to the 'normal' samples (i.e., regions where icing is absent or unaffected by icing). In various embodiments, a behavioral model for regions both affected and unaffected by icing may comprise two or more statistical models wherein each model corresponds to each learned class (e.g., 'normal' vs. 'affected by ice') of extracted features 312 from deep learning techniques applied by the FEM 302. In various embodiments, where two or more statistical models are built by the SMM 304, boundaries between the distributions may be learned by offline learning of a statistical classifier such as, for example, a support vector machine or a decision tree performing classification within the feature space. In various embodiments, feature distribution and class boundaries may be learned contemporaneously. In various embodiments, the SMM may pass a behavioral model 314 to an Ice Detection Module (IDM) 306 for additional processing.

In various embodiments, IDM 306 may perform pixel-level ice detection on imagery 310 from the IAM 300 by extracting features from previously unseen incoming imagery. In various embodiments, the IDM 306 may compute the statistics of the extracted features with respect to the behavioral model 314 constructed by the SMM 304 and estimate whether the extracted features belong to the 'normal' class or not. In various embodiments, a normal class may correspond to a region relatively free of ice, or unaffected by ice, or absent of ice. In various embodiments, samples which show good adherence to the SMM behavioral model 314 are deemed to correspond to areas unaffected by ice, i.e., belonging to the normal class, whereas those that deviate from the behavioral model 314 beyond a certain threshold are deemed to correspond to icy areas. In various embodiments, behavioral model 314 may comprise two or more models and classes (i.e., those from a SMM 304 supervised deep learning technique) and a decision as to which class each pixel belongs to is made by the IDM 306 in response to whether the individual pixel features fall inside or outside a class boundary. In various embodiments, the IDM 306 may pass pixel-level decisions 316 to an ice Shape/Size Analysis Module (SSAM) 308 for further processing.

Figure 4:
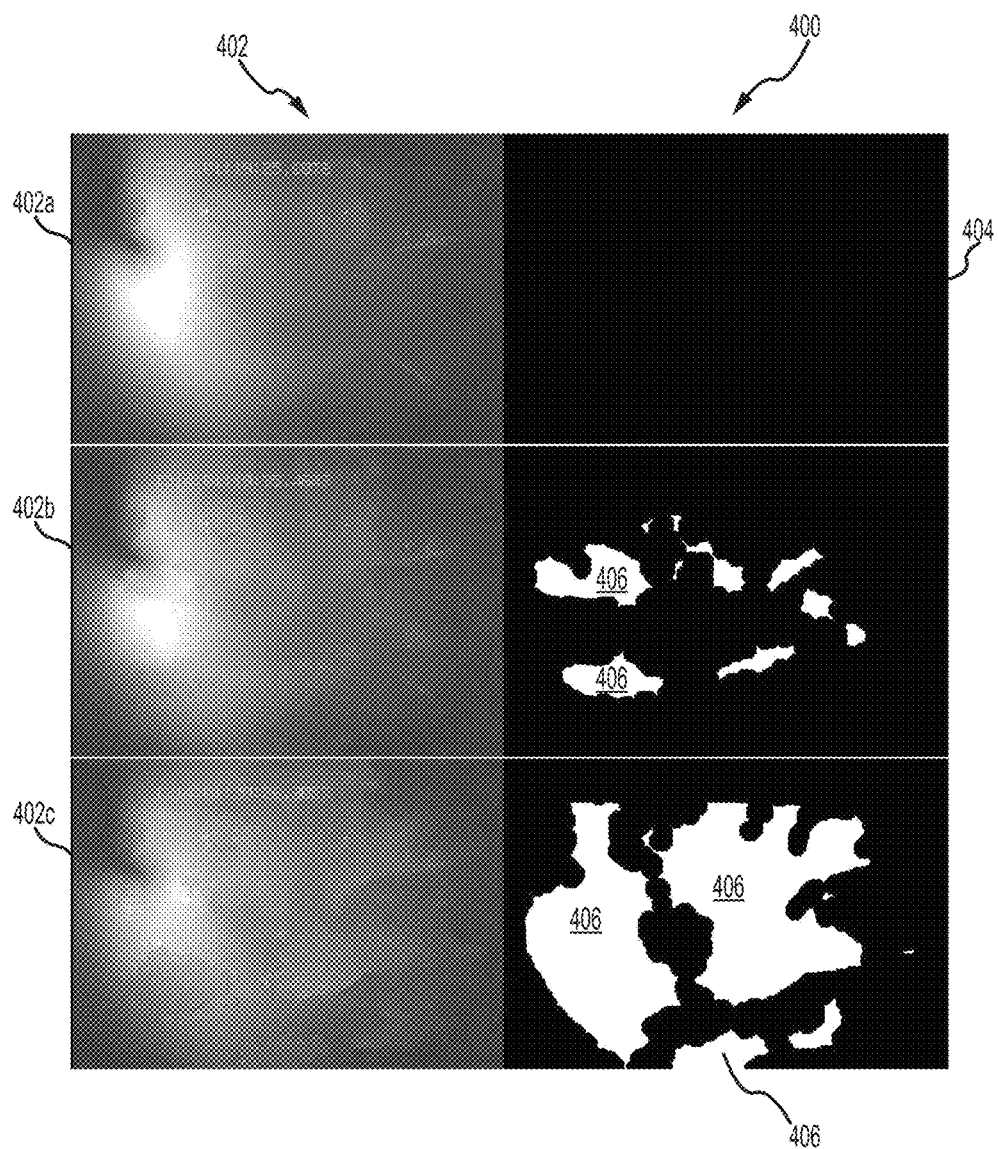
FIG. 4 illustrates a video signal and a pixel decision output of a system for aircraft ice detection and mitigation, in accordance with various embodiments.

In various embodiments and with additional reference to FIG. 4, pixel-level decisions 316 may be output from the IDM 306 in the form of a binary mask 400 of imagery 402 showing regions 404 where no ice is present (black pixels, i.e., belonging to the 'normal' class) and regions 406 where ice is present (white pixels) corresponding to the still frames (402*a*, 402*b*, and 402*c*) shown at left of the mask.

Figure 5:
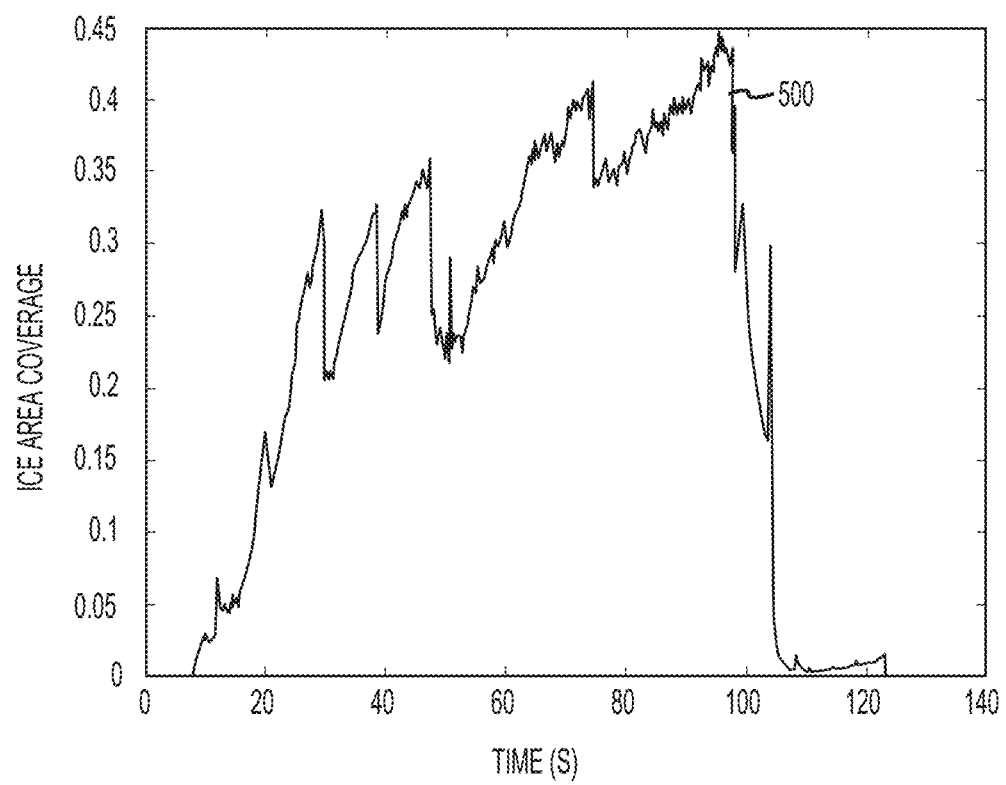
FIG. 5 illustrates a plot of ice area coverage with respect to time from a system for aircraft ice detection and mitigation.

In various embodiments, SSAM 308 may aggregate pixel-level decisions 316 to perform high-level analysis. SSAM 308 may aggregate pixel-level decisions 316 over into entire frame and may aggregate frames over time to compute statistics about ice area coverage and shape. In various embodiments and with additional reference to FIG. 5, a plot of ice area coverage with respect to time is illustrated having a trend line 500 generated by SSAM 308. The height (y-axis position) of trend line 500 corresponds to an ice area coverage of imagery such as imagery 402 as the ice area coverage changes over the time marked on the x-axis. In various embodiments, a depth-capable sensor may be used and statistics describing ice thickness behavior may be extracted in a like manner.

Figure 6:
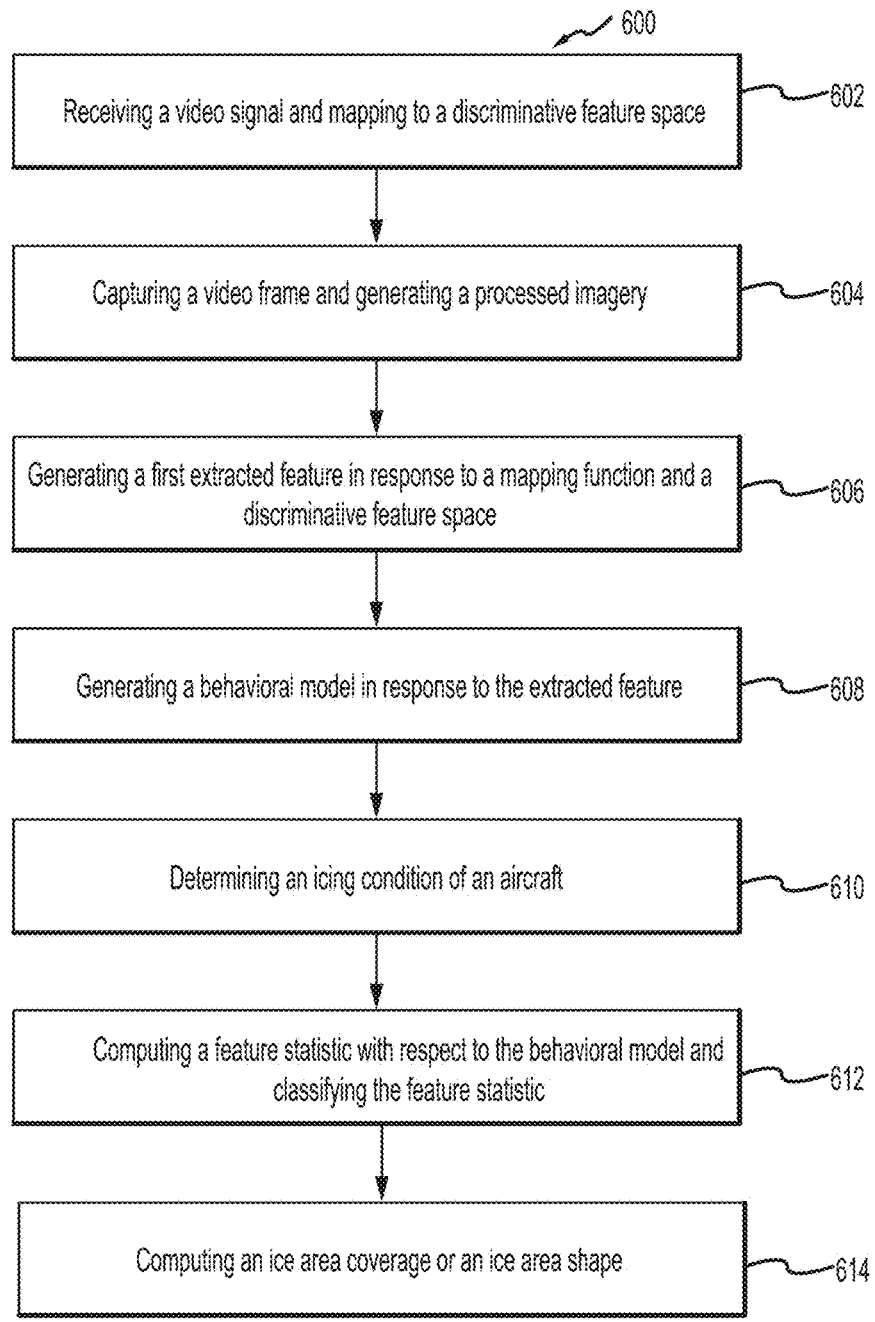
FIG. 6 illustrates a process flow for a method for aircraft ice detection and mitigation, in accordance with various embodiments

With reference to FIG. 6, a method 600 for aircraft ice detection and mitigation is illustrated in accordance with various embodiments. Method 600 includes receiving, by a controller, a video signal from a first data, and mapping the video signal to a discriminative feature space in response to a mapping function (Step 602). Method 600 includes capturing, by the controller, a video frame from the video signal; and generating, by the controller, a processed imagery from the video frame (Step 604). Method 600 includes generating, by the controller, a first extracted feature in response to the mapping function and the discriminative feature space (Step 606) and includes transmitting, by the controller, the first extracted feature to a statistical modeling module. Method 600 includes generating, by the controller, a behavioral model in response to the extracted feature (Step 608) and includes defining, by the controller, a first class boundary in response to the behavioral model. Method 600 includes determining, by the controller, an icing condition of an aircraft in response to the extracted feature and the behavioral model (Step 610). Method 600 includes extracting, by the controller, a second extracted feature; in response to one of the first extracted feature or the second extracted feature, computing, by the controller, a feature statistic with respect to the behavioral model; and classifying, by the controller, the feature statistic with respect to one of the first class boundary, a second class boundary, or the behavioral model (Step 612). Method 600 includes generating, by the controller, a classified feature statistic in response to the classifying, by the controller, the feature statistic with respect to one of the first class boundary, the second class boundary, or the behavioral model; aggregating, by the controller, the classified feature statistic over the video frame; and computing, by the controller, one of an ice area coverage or an ice area shape with respect to time in response to the aggregating, by the controller, the classified feature statistic over the video frame (Step 614).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for aircraft ice detection and mitigation on an aircraft, comprising:
    a controller;
    a sensor configured to identify a coverage area of the aircraft with apparently ice formation; and
    a tangible, non-transitory memory configured to communicate with the controller, the tangible, non-transitory memory having instructions stored in the memory that, in response to execution by the controller, cause the controller to:
    receive, from the sensor, a video signal from a first data comprising the identified apparently ice formation;
    generate a processed imagery from a captured video frame of the video signal;
    map the generated processed imagery to a discriminative feature space in response to a mapping function;
    generate, by the controller, a first extracted feature in response to the mapping function and the discriminative feature space;
    generate a behavioral model in response to the first extracted feature; and
    determine and confirm the ice formation on the coverage area of the aircraft in response to the first extracted feature and the behavioral model;
    wherein the generated processed imagery comprises pixel-level decisions over time in a form of binary masks of pixels showing regions where no ice is present and regions where ice is present corresponding to the captured video frame.

2. The system for aircraft ice detection and mitigation of claim 1, wherein the first data comprises sensor output from at least one of an image acquisition device, a depth sensitive device, a red, green, blue (RGB) sensor, an infrared sensor, a hyperspectral sensor, a multispectral sensor, or a thermal sensor.

3. The system for aircraft ice detection and mitigation of claim 1, wherein the instructions further cause the controller to transmit the first extracted feature to a statistical modeling module.

4. The system for aircraft ice detection and mitigation of claim 3, wherein the discriminative feature space is at least one of color, texture, edges, or a learned feature generated in response to at least one of a supervised deep learning technique or an unsupervised deep learning technique.

5. The system for aircraft ice detection and mitigation of claim 4, wherein the instructions further cause the controller to define a first class boundary in response to the behavioral model.

6. The system for aircraft ice detection and mitigation of claim 5, wherein the ice formation on the coverage area of the aircraft in response to the first extracted feature and the behavioral model is determined and confirmed by:
    extracting, by the controller, a second extracted feature;
    computing, by the controller, in response to one of the first extracted feature or the second extracted feature, a feature statistic with respect to the behavioral model; and
    classifying, by the controller, the feature statistic with respect to one of the first class boundary, a second class boundary, or the behavioral model.

7. The system for aircraft ice detection and mitigation of claim 6, wherein at least one of the first extracted feature or the second extracted feature is one of color, texture, edges, or a learned feature generated in response to at least one of the supervised deep learning technique or the unsupervised deep learning technique.

8. The system for aircraft ice detection and mitigation of claim 7, wherein the instructions further cause the controller to:
    generate a classified feature statistic in response to the classifying, by the controller, the feature statistic with respect to one of the first class boundary, the second class boundary, or the behavioral model;
    aggregate the classified feature statistic over the video frame; and
    compute one of an ice area coverage or an ice area shape with respect to time in response to the aggregating, by the controller, the classified feature statistic over the video frame.

9. The system for aircraft ice detection and mitigation of claim 1, wherein the aircraft further comprises an ice protection system in electronic communication with the controller.

10. The system for aircraft ice detection and mitigation of claim 9, wherein the instructions further cause the controller to control the aircraft ice protection system in response to the determining, by the controller, the ice formation on the coverage area of the aircraft.

11. A method for aircraft ice detection and mitigation on an aircraft, comprising:
    receiving, by a controller, a video signal from a first data comprising an identified apparently ice formation;
    generating, by the controller, a processed imagery from a captured video frame of the video signal;
    mapping, by the controller, the generated processed imagery to a discriminative feature space in response to a mapping function;
    generating, by the controller, a first extracted feature in response to the mapping function and the discriminative feature space;
    generating, by the controller, a behavioral model in response to the first extracted feature; and
    determining and confirming, by the controller, the ice formation on the coverage area of the aircraft in response to the first extracted feature and the behavioral model;
    wherein the generated processed imagery comprises pixel-level decisions over time in a form of binary masks of pixels showing regions where no ice is present and regions where ice is present corresponding to the captured video frame.

12. The method for aircraft ice detection and mitigation of claim 11, further comprising transmitting, by the controller, the first extracted feature to a statistical modeling module.

13. The method for aircraft ice detection and mitigation of claim 12, further comprising defining, by the controller, a first class boundary in response to the behavioral model.

14. The method for aircraft ice detection and mitigation of claim 13, further comprising extracting, by the controller, a second extracted feature; computing, by the controller, in response to one of the first extracted feature or the second extracted feature, a feature statistic with respect to the behavioral model; and classifying, by the controller, the feature statistic with respect to one of the first class boundary, a second class boundary, or the behavioral model.

15. The method for aircraft ice detection and mitigation of claim 14, further comprising generating, by the controller, a classified feature statistic in response to the classifying, by the controller, the feature statistic with respect to of the first class boundary, the second class boundary, or the behavioral model; aggregating, by the controller, the classified feature statistic over the video frame; and computing, by the controller, one of an ice area coverage or an ice area shape with respect to time in response to the aggregating, by the controller, the classified feature statistic over the video frame.

16. An article of manufacture including a tangible, non-transitory computer-readable storage medium having instructions stored in the memory that, in response to execution by a processor, perform a method for aircraft ice detection and mitigation on an aircraft and cause the processor to:
receive a video signal from a first data comprising an identified apparently ice formation;
generate a processed imagery from a captured video frame of the video signal;
map the generated processed imagery to a discriminative feature space in response to a mapping function;
generate a first extracted feature in response to the mapping function and the discriminative feature space;
generate a behavioral model in response to the first extracted feature; and
determine and confirm the ice formation on the coverage area of the aircraft in response to the first extracted feature and the behavioral model;
wherein the generated processed imagery comprises pixel-level decisions over time in a form of binary masks of pixels showing regions where no ice is present and regions where ice is present corresponding to the captured video frame.

17. The article of manufacture of claim 16, further comprising an operation of transmitting, by the processor, the first extracted feature to a statistical modeling module; defining, by the processor, a first class boundary in response to the behavioral model; extracting, by the processor, a second extracted feature; computing, by the processor, in response to one of the first extracted feature or the second extracted feature, a feature statistic with respect to the behavioral model; and classifying, by the processor, the feature statistic with respect to one of the first class boundary, a second class boundary, or the behavioral model.

18. The article of manufacture of claim 17, further comprising an operation of generating, by the processor, a classified feature statistic in response to the classifying, by the processor, the feature statistic with respect to one of the first class boundary, the second class boundary, or the behavioral model; aggregating, by the processor, the classified feature statistic over the video frame; and computing, by the processor, one of an ice area coverage or an ice area shape with respect to time in response to the aggregating, by the processor, the classified feature statistic over the video frame.

* * * * *